W. & J. WHAIT.
Grain Drill.

No. 67,008.  Patented July 23, 1867.

Witnesses:
F. Lehmann
Jno. A. Selie

Inventor:
Jos. Whait.
Wm. Whait.
per
J. H. Alexander.
Attorney.

United States Patent Office.

WILLIAM WHAIT AND JAMES WHAIT, OF INDEPENDENCE, IOWA.

Letters Patent No. 67,008, dated July 23, 1867.

IMPROVEMENT IN SEEDER AND CULTIVATOR.

The Schedule referred to in these Letters Patent and making part of the same.

TO ALL WHOM IT MAY CONCERN:

Be it known that we, JAMES WHAIT and WILLIAM WHAIT, of Independence, State of Iowa, have invented certain new and useful improvements in an agricultural implement which we denominate a Combined Cultivator and Seeder; and we do hereby declare that the following is a clear, full, and exact description of the same, reference being had to the annexed drawings, and to the letters of reference marked thereon, in which—

Figure 1:
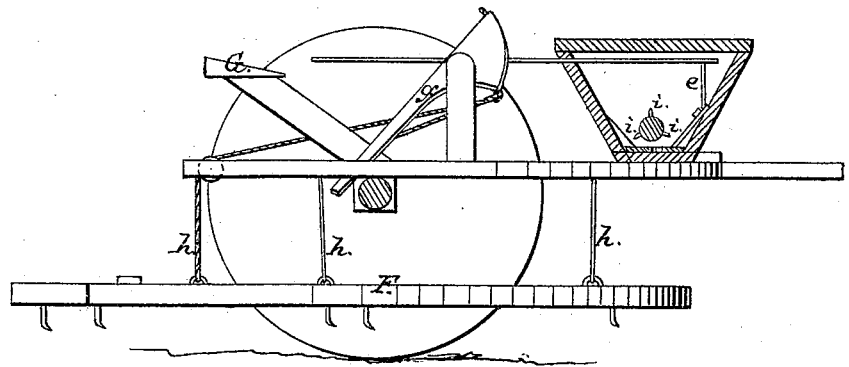

Figure 1 represents a side elevation with one wheel removed, and

Figure 2:
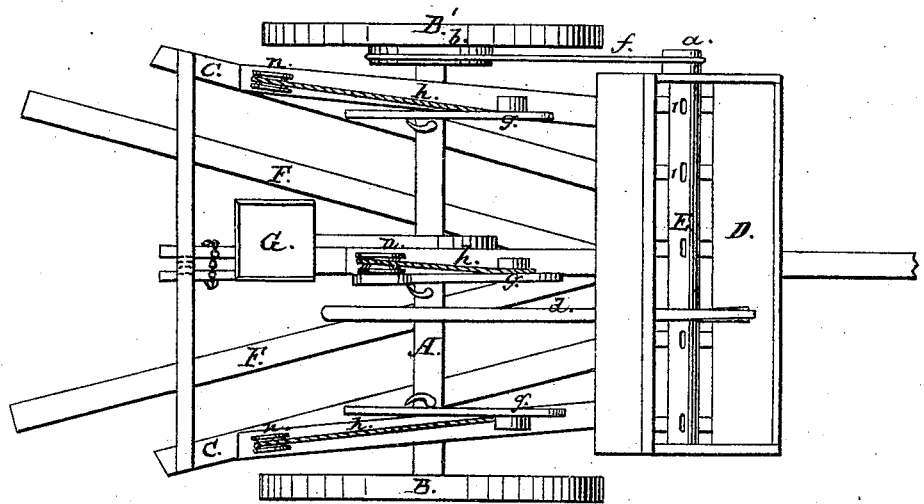

Figure 2 a plan view.

The nature of our invention consists in the employment, combination, and arrangement of the several devices hereinafter set forth and described, and to enable others skilled in the art to make and use it, we will now describe its construction and operation.

A is the axle and B B' the wheels. C represents the frame, upon the front part of which is secured the seed-box D, the bottom of said box being provided with holes for the exit of the grain. There should be an auxiliary metal bottom, which is oscillated by means of lever $d$. $e$ is the piece which connects lever $d$ with the oscillating bottom, which, it should also be observed, is provided with suitable apertures for escape of the grain, which, however, should not be directly over those in the main bottom when at rest. E represents a revolving shaft, upon the end of which is fixed pulley $a$. $b$ is a pulley attached to the inner side of wheel B', as fully shown in fig. 2. $f$ is a cord which passes around these pulleys, and by means of which the shaft E is operated. $i\ i$ are wings on shaft E for the purpose of agitating the grain, thereby preventing the machine from clogging. F represents a cultivator, which is or may be hinged longitudinally through its centre, as seen in fig. 2, thus, when desirable, either one side or the other may be suspended, while the opposite side continues in operation. $g\ g\ g$ are levers, pivoted to uprights on frame C. One end of these levers is made semicircular, as seen in fig. 1. $h\ h$ are cords which connect the cultivator to the levers, said cords passing over pulleys $n\ n$ in frame C. G is the seat for the driver.

Thus it will be seen that the working of our machine is entirely under easy control of the operator by means of the levers $g\ g\ g$ and $d$.

What we claim, and desire to secure by Letters Patent, is—

The seed-box, with oscillating bottom, shaft E provided with wings, levers $d$ and $g\ g\ g$, cultivator F, and cords $h\ h\ h$, when all are arranged substantially in the manner and for the purpose herein set forth.

In testimony that we claim the above we set our signatures in presence of two witnesses.

WM. WHAIT,
JAS. WHAIT.

Witnesses:
 ELI OZIAS,
 JED. LAKE.